Patented Feb. 2, 1943

2,309,867

UNITED STATES PATENT OFFICE 2,309,867

SUBSTITUTED DERIVATIVES OF SATURATED OR UNSATURATED PREGNANE-DIONES

Tadeus Reichstein, Basel, Switzerland, assignor to the firm Roche-Organon, Inc., Nutley, N. J.

No Drawing. Application May 13, 1940, Serial No. 334,988

21 Claims. (Cl. 260—397.4)

This invention is a further development of the inventions described and claimed in my copending applications Ser. Nr. 195,161, filed March 10, 1938, Ser. Nr. 195,162, filed March 10, 1938, and Ser. Nr. 255,483, filed February 9, 1939, as a division of the aforesaid application Ser. No. 195,161, and relates to 3,20-diketones of the saturated and unsaturated pregnane series carrying a substituent at the $C_{21}$ carbon atom and which may further carry additional substituents in the ring system, all as more fully described hereinafter.

In my applications Ser. Nr. 195,161 and Ser. Nr. 255,483 a process was described and claimed whereby saturated or unsaturated etiocholanic acids, which might contain further substituents in the ring system, especially oxygen in different forms of combination, were converted into the corresponding diazo-21-pregnane-ones-20. In particular the production of such derivatives as bear a free hydroxyl group at the carbon atom $C_3$ was described. The general formula of such compounds is given by formula I

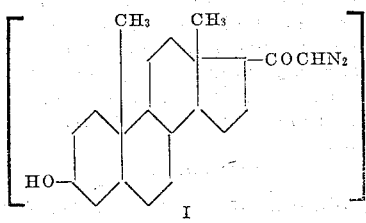

$X$=halogen, OH, O-alkyl, O-aralkyl, O-acyl, =O
$a$=an integer or zero

The ring system may contain one or more double bonds

In these diazo compounds the $COCHN_2$ group was immediately subjected to further treatment to convert it into a $COCH_2R$ group, wherein R indicates halogen, hydroxyl, acyloxyl or alkoxyl.

In my application Ser. Nr. 195,162 I described a process for oxidizing the 3-hydroxyl group in the compounds with a $COCH_2R$ group so formed to a keto group, whereby saturated or unsaturated derivatives of pregnane-dione-3,20 are produced. The said conversion of the $COCHN_2$ group into a $COCH_2R$ group was effected at an early stage of the process because it was thought desirable to transform the diazo group as soon as possible into a group, which is known to be stable to various treatments. It is well known in the art that aliphatic diazo compounds are generally extremely unstable.

Surprisingly, however, I have now found that it is possible to oxidize to a keto group the 3-hydroxyl group in the said diazo compounds without decomposition of the diazo group. In this way the diazo-21-diketo-3,20-derivatives of the general formula II are obtained

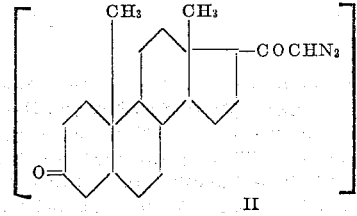

In the preferred embodiment of this process I effect the oxidation with an excess of a carbonyl compound as the oxidizing agent in the presence of a metal alcoholate. An inert solvent may be added to the reaction mixture. The oxidation can either be effected at room temperature or at elevated temperatures, e. g. at the boiling point of the reaction mixture. In the former case the time required to complete the reaction will evidently have to be prolonged.

The diazo-21-pregnane-diones-3,20 which are obtained by the oxidation can be subjected to the action of acids, whereby the diazo group may be converted into various other groups. For example by treatment with hydrogen halides in substantially anhydrous solution the 21-diazo compounds are converted into the 21-halogen compounds. Upon reaction of the diazo compounds with dilute aqueous solutions of inorganic oxygenous acids or of organic sulphonic acids the diazo group is hydrolysed to a hydroxyl group. By treatment with an organic carboxylic acid in the absence of water, derivatives with an acyloxyl group at the carbon atom $C_{21}$ are obtained.

Moreover, by treatment with anhydrous inorganic oxygenous acids in a suitable solvent, inorganic 21-esters can be obtained. If the inorganic oxygenous acid is polybasic, the esters so formed are capable of forming water soluble salts which are suitable for intravenous injection.

Various substituents, such as halogen, hydroxyl, alkoxyl, aralkoxyl, acyloxyl and keto groups, may be present in the ring system, which may also contain one or more double bonds. All this is without influence on the course of the reaction. If, apart from the hydroxyl group, at the carbon atom $C_3$, other secondary hydroxyl groups are present they may, however, also be oxidized to a keto group. Special advantages of my process are that pregnane-diones-3.20 with various substituents at the carbon atom $C_{21}$ can now be obtained directly, e. g. there is no longer any need for protection of a hydroxyl group, if present, at $C_{21}$, as in the process described in my application Ser. Nr. 195,162. Further the production of various 21-substituted pregnane diones-3.20 is simplified; the processes for obtaining these various compounds now run parallel until the stage of the diazo-21-diketo-3.20 compounds.

Moreover, the yields obtained by the new process compare in most cases very favorably with those of processes formerly known. So the conversion of the diazo-21-pregnane-diones with anhydrous organic acids gives almost quantitative yields. Since also the oxidation gives excellent yields, the all-over yield in the production of the 21-substituted pregnane-diones from the corresponding hydroxy-3-etiocholanic acids is considerably higher than in former processes.

A further advantage is that the diazo-21-diketo-3.20 compounds, e. g. the diazo-21-progesterone, are excellently crystallizing substances, which considerably facilitates the purification of same.

The products obtained by my process are therapeutically valuable or may serve as intermediates for the production of therapeuticals.

In order to make the process more clear examples and formulae for the reactions involved will be given. For the sake of simplicity a simple case will be discussed, viz. the production of derivatives of pregnene-4-ol-21-dione-3.20 (desoxycorticosterone). It is to be understood, however, that my invention is not limited to these examples but may be varied within the scope of the appended claims.

For example one starts with diazo-21-pregnene-5-ol-3-one-20 (III) which is oxidized to diazo-progesterone (IV). From this with hydrogen halides the halogen-dione (V) is formed. By hydrolysis of IV with the aid of aqueous solutions of inorganic oxygenous acids or of organic sulphonic acids desoxycorticosterone (VI) is formed; by treatment of IV with substantially anhydrous organic carboxylic acids the carboxylic acid esters of desoxycorticosterone (VII) are formed. Finally, by reacting IV with an inorganic oxygenous acid an inorganic ester of desoxycorticosterone, e. g. the phosphate (VIII), is formed. If an inorganic polybasic oxygenous acid is used the ester with desoxycorticosterone will have acidic properties and may be converted into a salt.

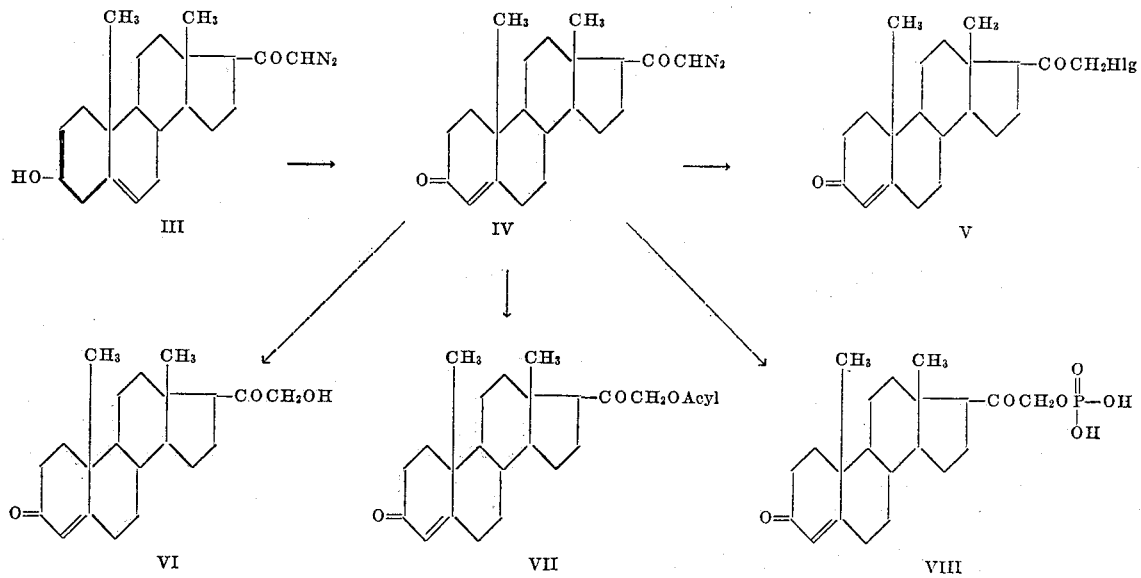

Example 1

200 mg. of diazo-21-pregnene-5-ol-3-one-20, 500 mg. of aluminium tertiary butylate, 20 cc. of dry benzene and 6 cc. of acetone were mixed in a glass tube, which was sealed and allowed to stand at room temperature, for 20 days. Thereupon the mixture was diluted with ether, washed in succession with solutions of Seignette-salt, and of sodium carbonate and with water. The ethereal solution was dried with sodium sulphate, whereupon the ether was evaporated, first on a water bath and finally in vacuo. To the residue a small quantity of dry ether was added, after which crystallisation occurred immediately. The crystals were washed with ether. The diazo-progesterone obtained melted at 182–184° C. (corrected) under decomposition. The yield was 136 mg. The compound is very slightly soluble in ether, moderately soluble in acetone and easily soluble in benzene. The crystals are of a light yellow colour.

Example 2

60 g. of diazo-21-pregnene-5-ol-3-one-20 are dissolved in 2200 cc. of thiophene-free dry benzene and 1100 cc. of acetone previously distilled over potassium permanganate. 150 g. of aluminium tertiary butylate are added. The mixture is heated to 68–70° under stirring for 7 hours. After cooling the solution is extracted twice with 500 cc. of 5% Seignette-salt solution and subsequently washed twice with 400 cc. of 5% sodium carbonate solution and four times with water. The washings are extracted twice with benzene. The benzene solutions are combined and dried with sodium sulphate. After filtering off the sodium sulphate the benzene is evaporated in vacuo at 50° C. When no more liquid distills 300 cc. of dry ether are added to the residue. After standing for 10 hours at —5° C. the yellow, finely grained diazo-21-progesterone is filtered by suction, washed with dry ether and dried at 50° C. The yield is 42 g. It decomposes at 175–180°.

Example 3

20 mg. of diazo-21-progesterone were mixed with a solution of 0.2 g. of dry gaseous hydrochloric acid in 3 cc. of dry ether. The crystals quickly dissolved under evolution of nitrogen. After 3 minutes the solution was diluted with a small quantity of ether and washed with water, sodium carbonate solution and again with water. The ethereal solution was dried with sodium sulphate and evaporated to a small volume, whereupon colourless crystals separated which were washed with a small quantity of ether. The substance melted at 201–204° (corrected) and showed to be identical with chloro-21-progesterone (mixed melting point). The yield was 14 mg.

Example 4

2 g. of diazo-21-progesterone are dissolved in 28 cc. of dioxane of purest quality. 21 cc. of 2 N sulfuric acid are added. A slight evolution of nitrogen sets in at room temperature; it ceases after heating to 40° C. during 15 minutes. The reaction mixture is poured into 400 cc. of water, the mixture is extracted twice with 200 cc. of ether. The ethereal solution is washed three times with 5% sodium carbonate solution and three times with water and subsequently dried with sodium sulphate. After filtering off the sodium sulphate the ethereal solution is evaporated to a small volume. 1.54 g. of desoxycorticosterone crystallize. Melting point 132–138° C. After recrystallizing once from ether 1.44 g. are obtained with melting point 137–140½°.

Example 5

A suspension of 8 g. of diazo-21-progesterone in 30 cc. of glacial acetic acid, previously distilled over chromic acid, is cautiously heated on a water bath. At about 70° C. the solid is practically dissolved and evolution of nitrogen begins. The temperature is raised to 90° C. in 15 minutes, after which the evolution of nitrogen has come to an end. The brownish solution is poured into 600 cc. of water, whereafter the mixture is extracted twice with 200 cc. of benzene. The benzene solution is neutralized by washing it twice with 250 cc. of 5% sodium carbonate solution and is afterwards washed three times with water. The solution of desoxycorticosterone acetate obtained is dried with sodium sulphate, and the benzene is evaporated in vacuo after filtering off the sodium sulphate. The residue, which crystallizes easily, is recrystallized from 50 cc. of an acetone water mixture (4:1). The yield is 7.4 g. of desoxycorticosterone acetate. The melting point is 156–158° C. (corrected). $(\alpha)_D = +174°$.

Example 6

9.5 g. of diazo-21-progesterone and 23 g. of benzoic acid are dissolved in 50 cc. of toluene. Upon heating on a water bath a vigorous evolution of nitrogen sets in at 80° C. which stops, when the temperature has been raised to 90° C. after about 20 minutes. After cooling the reaction mixture is diluted with 200 cc. of ether and washed out with 400 cc. of water, three times with 250 cc. of 5% sodium carbonate solution and then again three times with 250 cc. of water. After drying with sodium sulphate and filtering the ether and the toluene are distilled off. The residue is crystallized from 60 cc. of 80% acetone. 8 g. of desoxycorticosterone benzoate are obtained. After repeated recrystallization from an acetone water mixture the melting point is 206½–208° C. $(\alpha)_D = +204°$.

Example 7

Diazo-21-progesterone is gently heated in dioxane with the calculated quantity of anhydrous phosphoric acid. At a temperature of 45–50° C. the reaction is completed in about 10 minutes. The reaction mixture is evaporated in a high vacuo, the residue is mixed with water and thereafter the desoxycorticosterone phosphate obtained is extracted with ethyl acetate. The extract is washed with water and evaporated in vacuo. The residue is dissolved in methanol, after which exactly the calculated quantity of sodium methylate is added. The solution has a slightly alkaline reaction towards litmus. It is first evaporated in vacuo, the residue is dried and again dissolved in methanol, whereupon any insoluble substances are separated by filtration. The solution obtained is again evaporated to a small volume, whereafter the reaction product is precipitated by acetone. The sodium salt of desoxyvorticosterone phosphate obtained is washed with acetone and ether. It is easily soluble in water and upon analysis shows the calculated phosphorus content.

What I claim is:

1. The process which comprises converting to a keto group the 3-hydroxyl group in a compound having the empirical formula

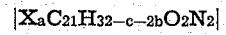

and the structural formula

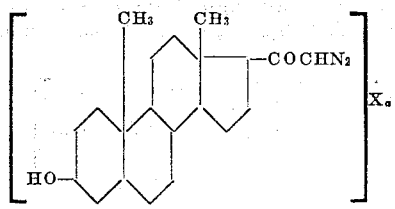

in which X indicates substituents in the ring system selected from the group consisting of halogen, hydroxyl, alkoxyl, aralkoxyl, acyloxyl, and keto groups; $a$ denotes a number from the group of zero and an integer; $b$ is a number from the group of zero and an integer which denotes the number of double bonds in the ring system, and $c$ denotes the number of hydrogen atoms substituted by mild oxidation in the presence of aluminum tertiary butylate.

2. The process which comprises oxidizing to a keto group the 3-hydroxyl group in a compound having the empirical formula

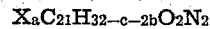

and the structural formula

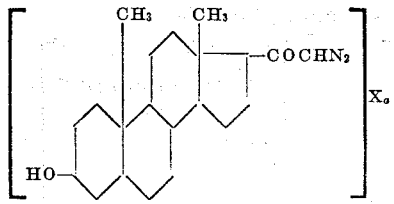

in which X indicates substituents in the ring system selected from the group consisting of halogen, hydroxyl, alkoxyl, aralkoxyl, acyloxyl and keto groups; $a$ denotes a number from the group of zero and an integer; $b$ is a number from the group of zero and an integer which denotes the number of double bonds in the ring system, and $c$ denotes the number of hydrogen atoms substituted; whereupon the oxidation product is subjected to the action of an acid, and further characterized in that the oxidation is effected with an excess of a carbonyl compound in the presence of aluminum tertiary butylate.

3. The process which comprises oxidizing to a keto group the 3-hydroxyl group in a compound having the empirical formula

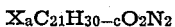

and the structural formula

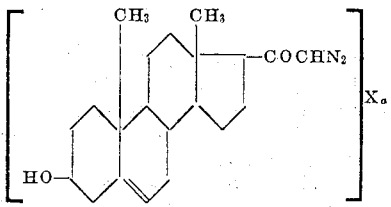

in which X indicates substituents in the ring system selected from the group consisting of halogen, hydroxyl, alkoxyl, aralkoxyl, acyloxyl and keto groups; $a$ denotes a number from the group of zero and an integer and $c$ denotes the number of hydrogen atoms substituted; and further characterized in that the oxidation is effected with an excess of a carbonyl compound in the presence of tertiary aluminum butylate.

4. The process which comprises converting, by mild oxidation in the presence of aluminum tertiary butylate, to a keto group the 3-hydroxyl group in a compound having the empirical formula $X_aC_{21}H_{30-c}O_2N_2$ and the structural formula

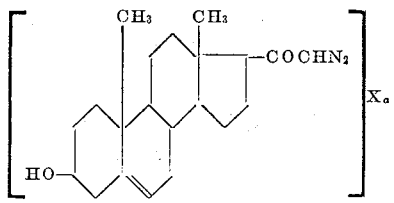

in which X indicates substituents in the ring system selected from the group consisting of halogen, hydroxyl, alkoxyl, aralkoxyl, acyloxyl and keto groups; $a$ denotes a number from the group of zero and an integer and $c$ denotes the number of hydrogen atoms substituted; and thereafter subjecting the oxidation product to the action of an acid.

5. The process which comprises oxidizing to a keto group the 3-hydroxyl group in a compound having the empirical formula

and the structural formula

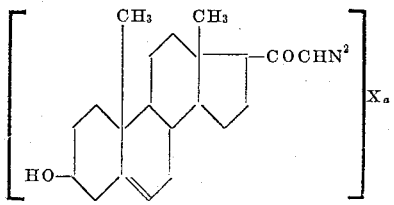

in which X indicates substituents in the ring system selected from the group consisting of halogen, hydroxyl, alkoxyl, aralkoxyl, acyloxyl and keto groups; $a$ denotes a number from the group of zero and an integer and $c$ denotes the number of hydrogen atoms substituted; whereupon the oxidation product is subjected to the action of an acid and further characterized in that the oxidation is effected with an excess of a carbonyl compound in the presence of aluminum tertiary butylate.

6. The process which comprises converting to a keto group the 3-hydroxyl group in diazo-21-pregnene-5-ol-3-one-20 by mild oxidation in the presence of aluminum tertiary butylate.

7. The process which comprises oxidizing to a keto group the 3-hydroxyl group in diazo-21-pregnene-5-ol-3-one-20 by treatment with an excess of a carbonyl compound in the presence of aluminum tertiary butylate.

8. The process which comprises converting to a keto group the 3-hydroxyl group in diazo-21-pregnene-5-ol-3-one-20 by mild oxidation in the presence of aluminum tertiary butylate, whereupon the diazo progesterone obtained is subjected to the action of an acid.

9. The process which comprises oxidizing to a keto group the 3-hydroxyl group in diazo-21-pregnene-5-ol-3-one-20 by treatment with an excess of a carbonyl compound in the presence of aluminum tertiary butylate, whereupon the diazo progesterone obtained is subjected to the action of an acid.

10. A process for the preparation of desoxycorticosterone which comprises oxidizing to a keto group the 3-hydroxyl group in diazo-21-pregnene-5-ol-3-one-20 by treatment with an excess of a carbonyl compound in the presence of aluminum tertiary butylate, whereupon the diazo progesterone obtained is hydrolysed.

11. A process for the preparation of carboxylic acid esters of desoxycorticosterone, which comprises oxidizing to a keto group the 3-hydroxyl group in diazo-21-pregnene-5-ol-3-one-20 by treatment with an excess of a carbonyl compound in the presence of aluminum tertiary butylate, whereupon the diazo progesterone obtained is treated with an organic carboxylic acid under substantially anhydrous conditions.

12. A process for the preparation of inorganic acid esters of desoxycorticosterone, which comprises oxidizing to a keto group the 3-hydroxyl group in diazo-21-pregnene-5-ol-3-one-20 by treatment with an excess of a carbonyl compound in the presence of aluminum tertiary butylate, whereupon the diazo progesterone obtained is treated with an inorganic acid under substantially anhydrous conditions.

13. A process for the preparation of esters of desoxycorticosterone with a polybasic oxygenous inorganic acid, which comprises oxidizing to a keto group the 3-hydroxyl group in diazo-21-pregnene-5-ol-3-one-20 by treatment with an excess of a carbonyl compound in the presence of aluminum tertiary butylate, whereupon the diazo progesterone obtained is treated with a polybasic oxygenous inorganic acid under substantially anhydrous conditions.

14. A process for the preparation of salts of esters of desoxycorticosterone with a polybasic oxygenous inorganic acid, which comprises oxidizing to a keto group the 3-hydroxyl group in diazo-21-pregnene-5-ol-3-one-20 by treatment with an excess of a carbonyl compound in the presence of aluminum tertiary butylate, whereupon the diazo progesterone obtained is treated with a polybasic oxygenous inorganic acid under substantially anhydrous conditions and the acid ester so formed is further converted into a salt.

15. A process for the preparation of phosphoric acid esters of desoxycorticosterone, which comprises oxidizing to a keto group the 3-hydroxyl group in diazo-21-pregnene-5-ol-3-one-20 by treatment with an excess of a carbonyl compound in the presence of aluminum tertiary butylate, whereupon the diazo progesterone obtained is treated with a phosphoric acid under substantially anhydrous conditions.

16. A process for the preparation of salts of phosphoric acid esters of desoxycorticosterone, which comprises oxidizing to a keto group the 3-hydroxyl group in diazo-21-pregnene-5-ol-3-one-20 by treatment with an excess of a carbonyl compound in the presence of aluminum tertiary butylate, whereupon the diazo progesterone obtained is treated with a phosphoric acid under substantially anhydrous conditions and the desoxycorticosterone phosphate so formed is further converted into a salt.

17. A compound of the group consisting of the phosphoric acid esters of desoxycorticosterone and the salts thereof.

18. The sodium salts of phosphoric acid esters of desoxycorticosterone.

19. The sodium salt of desoxycorticosterone orthophosphate.

20. Process for preparing derivatives of the saturated and unsaturated pregnane series having a 3-position keto substituent that comprises reacting the corresponding compound having a 21-diazonium group substituent with an acid in the substantial absence of water.

21. Method of preparing therapeutically useful substances of the saturated and unsaturated pregnane series that comprises reacting a substance of said series having a 3-position hydroxyl substituent and a 21-position diazonium group substituent with an agent containing a reactive carbonyl group in the presence of a metallic alcoholate, and thereafter destroying the diazonium group of the reaction product in an acid reagent whereby the corresponding acid derivative is obtained.

TADEUS REICHSTEIN.